Jan. 5, 1954        W. A. HERBST           2,665,315
                 ADSORPTIVE DISTILLATION
                  Filed March 19, 1951
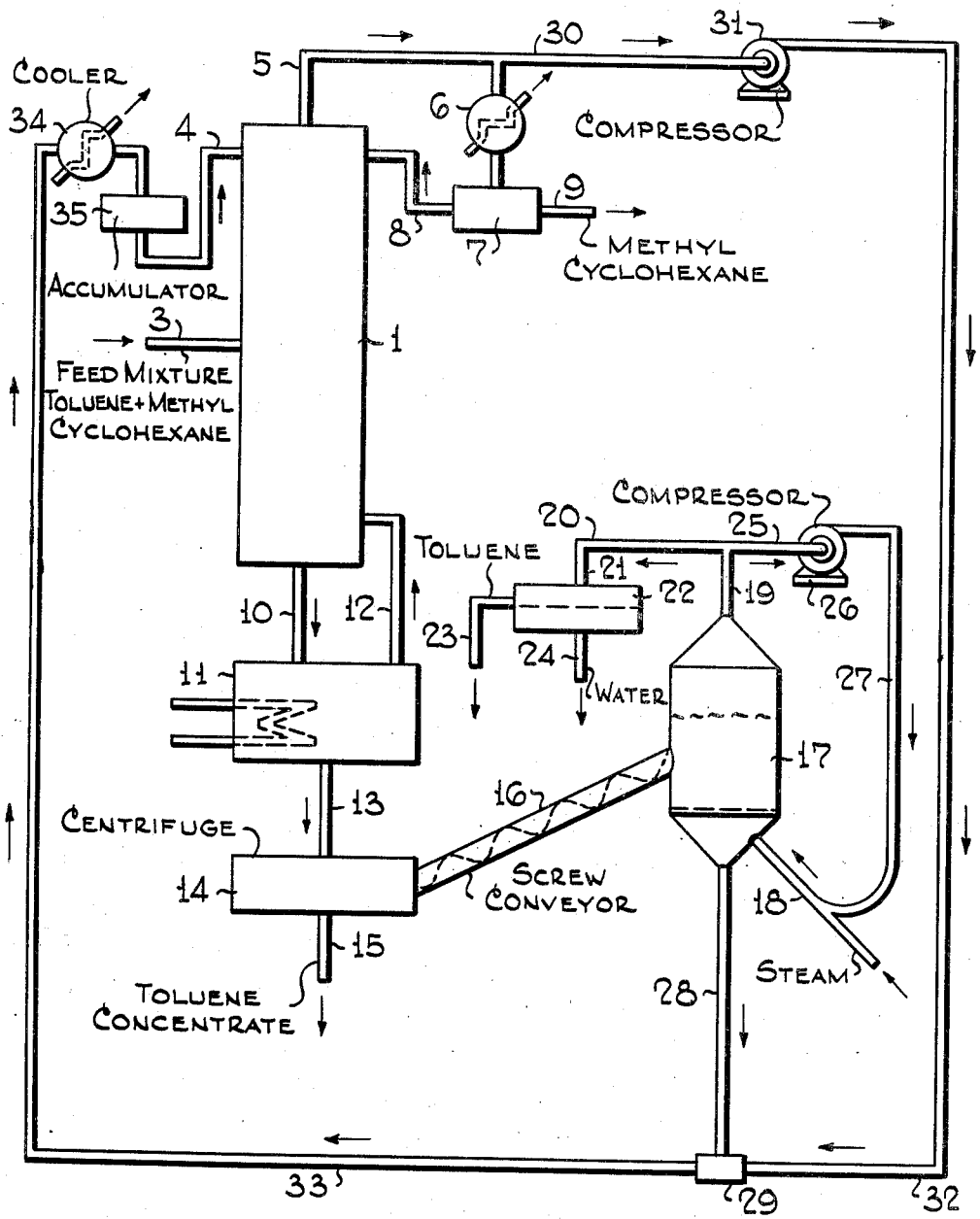
Walter A. Herbst    Inventor
By J. C. Amall    Attorney Patented Jan. 5, 1954

2,665,315

UNITED STATES PATENT OFFICE 2,665,315

ADSORPTIVE DISTILLATION

Walter A. Herbst, Union, N. J., assignor to Standard Oil Development Company, a corporation of Delaware Application March 19, 1951, Serial No. 216,293

7 Claims. (Cl. 260—666)

This invention relates to a practical method of separating hydrocarbons which are difficult to separate by ordinary distillation and more particularly relates to the distillation of the hydrocarbons in the presence of a solid adsorbent.

The present invention is made possible by the discovery that when a mixture of close-boiling hydrocarbons is fractionally distilled in the presence of a reflux consisting of a slurry of a solid adsorbent suspended in a liquid hydrocarbon mixture the relative volatilities of the hydrocarbons are altered to such an extent that separations which were impractical by ordinary distillation become practical in the presence of the adsorbent.

The relative volatility mentioned above is the volatility of one component divided by that of the other, the volatility of each component being proportional to its partial pressure divided by mol fraction in the liquid phase. It is also defined by the equation: $\mathrm{alpha} = (y_1/y_2)/(x_1/x_2)$ where $y$ refers to the vapor phase mol fractions of the components to be separated and $x$ refers to the liquid phase mol fractions of the components to be separated. Subscript 1 designates one component and subscript 2 designates the other component.

The process of this invention is best applied to distillation cuts or mixtures, the components of which distill within a narrow range; however, it may be applied to wide-boiling mixtures as well. The invention is particularly directed to the separation of fractions whose boiling ranges are narrow enough that the decrease in volatility of the more adsorbed component is sufficient to make it less volatile than the highest boiling non-adsorbed component, or, to the separation of fractions in which the more adsorbed component is at the same time one of the higher boiling compounds in the mixture. Typical separations which can be made are toluene from lower boiling contaminants such as may exist in the 200-235° F. boiling range fraction from virgin naphthas; olefins from narrow boiling naphtha fractions, e. g. $C_6$ olefins from 140°-160° F. fractions from thermally or catalytically cracked naphthas and $C_7$ olefins from the 170°-210° F. fractions, etc. and the separation of paraffinic hydrocarbons from their more highly branched isomers, e. g. 2,4-dimethyl pentane from triptane. Suitable adsorbents include silica gel, activated carbon, activated coconut charcoal (described in U. S. 2,425,535), bauxite, activated alumina, or mixtures thereof. The activated coconut charcoal is particularly desirable for use in separating mixtures of straight-chain and branched hydrocarbons, the activated coconut charcoal adsorbing the normal paraffins to a greater extent than the branched-chain hydrocarbons.

To obtain the desired separation of hydrocarbons from mixtures like that mentioned with benefits of the present invention, the mixture is subjected to a continuous fractional distillation in a column of practical size, including a rectification zone and a stripping zone below the rectification zone for countercurrent vapor slurry contact under re-boiling and refluxing conditions. Any desired type of column may be used such as a bubble plate column, a disc and donut column, a packed column or any other conventional type desired. A sufficiently large quantity of solid adsorbent is introduced as a slurry at the upper part of the rectification zone to effectively modify the relative volatilities of the organic compounds to be separated and to distill a larger part of one component or group of components than of another component or another group of components from the internal reflux.

The separation can be effected in a continuous manner under steady state conditions to obtain product streams of desired purities and constant compositions while supplying the adsorbent to the upper part of the rectification zone. The temperature of the slurry introduced into the rectification zone is preferably close to the temperature within the column at that point, although it may be lowered to partially condense vapors ascending to the slurry feed point.

Since the efficient operation is essentially continuous, the slurry is added continuously near the top of the rectification zone of the column while the mixture of hydrocarbons to be separated is fed continuously into the column at a lower point while sufficient heat is provided in a reboiler at the bottom to afford distillation throughout the column.

The feed stream of hydrocarbon is preferably introduced into the fractionating column between the rectification zone and the stripping zone at a point where the ratio of the main hydrocarbons to be separated in the feed is similar to the ratio of these hydrocarbons in the column.

The feed stream is preferably preheated to a temperature close to that of the internal reflux under practically equilibrium boiling conditions at the point of introduction. The preheated feed stream may be liquid, partially vaporized, or completely vaporized when introduced into the fractionating column.

Vapors of the hydrocarbons introduced as a feed stream at the bottom part of the rectification zone in the fractionating column pass up through the rectification zone in contact with descending adsorbent as a slurry in internal liquid reflux under practically equilibrium reboiling and refluxing conditions.

The quantity of adsorbent required to be introduced continuously at the upper part of the rectification zone for accomplishing the desired separation of the close-boiling hydrocarbons is considerably greater than the quantity of feed fed simultaneously to the column at the bottom of the rectification zone. The ratio of solid adsorbent to hydrocarbon feed must be substantially above a critical minimum of the order of 100 to 200 weight percent. This internal reflux slurry in flowing from the top to the bottom becomes richer in the hydrocarbons having the lowest relative volatility in the presence of the adsorbent, while the hydrocarbons having the highest relative volatility are distilled overhead. With adequate adsorbent feed rate, the hydrocarbon component to be isolated in the bottoms is slurried with the adsorbent by the time it reaches the bottom part of the stripping zone.

The overhead vapors from the rectification zone are enriched in one or more of the hydrocarbon components rendered relatively more volatile by the adsorbent while the remaining portion of the hydrocarbon material introduced with the feed remains dissolved in the internal reflux. For example, in separating a mixture of two hydrocarbons the distillation may be carried out so that either one of the hydrocarbons is obtained free of the other. In separating 2,4-dimethyl pentane from triptane (2,2,3-trimethyl butane), the distillation may be conducted so that 2,4-dimethyl pentane is obtained overhead and a mixture of 2,4-dimethyl pentane and triptane is obtained in the bottoms or a portion of the triptane may be taken overhead with the 2,4-dimethyl pentane so that triptane free of 2,4-dimethyl pentane is obtained in the bottoms. This, of course, depends somewhat upon the adsorbent used. If activated chemico coke is used as the adsorbent, the 2,4-dimethyl pentane will be adsorbed and removed as bottoms. With other adsorbents the process will be as described above.

The functioning of the stripping zone may be described as follows:

The mixture of the close-boiling hydrocarbons to be separated, as in the liquid reflux slurry from the bottom of the rectification zone, flows downwardly through the stripping zone in countercurrent contact with ascending vapors evolved from the slurry under reboiling conditions. A sufficiently high concentration of adsorbent is maintained in the slurry flowing down through the stripping zone, as in the rectification zone, to make the slurry progressively richer in hydrocarbons having the lowest relative volatility while the hydrocarbons having the highest relative volatility are stripped from the slurry. Under practically equilibrium reboiling and refluxing conditions for complete stripping in the stripping zone, the hydrocarbons rendered more volatile may be removed as vapor overhead from the stripping zone at the same rate that they enter the stripping zone as part of the liquid feed to this zone and a slurry of the adsorbent in the less volatile hydrocarbons, may be withdrawn from a bottom part of the stripping zone.

In the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

This invention will be described in detail as applied to the separation of a mixture of toluene and methylcyclohexane.

Referring to the drawing, a feed fraction is introduced by line 3 into the tower 1 where it is fractionated in the presence of silica gel adsorbent introduced through line 4 as a slurry in a portion of the reflux, at a point essentially at the top of the tower. The conditions in the tower are such as to cause a distillation of the hydrocarbons in the presence of the silica gel. The silica gel is added at a rate equivalent to 100-800 weight percent that of the hydrocarbon feed. The concentration of the solids in the slurry in the tower is maintained at a level, usually below 50 weight percent, giving a fluid, flowable slurry. As the vapors of the feed pass up the column some of them are adsorbed on the large excess of silica gel descending the column. Conditions are maintained throughout the tower such that the liquid mixtures of the toluene and methylcyclohexane are at their boiling points and are continuously being contacted with vapors from below. Because of the enhanced volatility of the methylcyclohexane in relation to the toluene the vapors are relatively rich in the former and poor in the latter. By maintaining the ratio of the adsorbent to hydrocarbon feed rates at a point that would ordinarily result in substantially complete adsorption of the feed, the optimum relative volatilities for the separation of the desired components can be secured. Significant separations, however, can be achieved at lower adsorbent rates. Furthermore, by controlling the amount of hydrocarbon reflux and consequently the reflux ratio, the actual degree of separation may be varied until the desired product purity and recovery are obtained. Thus, suitable temperature and reflux conditions are maintained in the tower so that substantially pure methylcyclohexane appears in the overhead stream and toluene adsorbed on and slurried with silica gel appears in the bottom product.

Overhead vapors consisting substantially of pure methylcyclohexane are withdrawn from the top of column 1 through line 5 by which they are passed through condenser 6 to a receiver 7. A portion of the condensate collected in receiver 7 is returned to the top part of the column 1 as external reflux through line 8. The remaining portion of distillate collected in receiver 7 is withdrawn through line 9 as a product.

Bottoms liquid consisting of a slurry, in toluene concentrate, of the silica gel containing adsorbed toluene collected at the lower part of column 1 is passed by line 10 into reboiler 11 for heating by a heating medium such as steam. A portion of the vaporized hydrocarbons thus produced in the reboiler 11 is passed by line 12 to the lower part of column 1. The remaining portion is withdrawn through line 13 to centrifuge 14 where silica gel is separated from the toluene concentrate which is removed through line 15. The silica gel is removed from the centrifuge and passed by screw conveyor 16 to desorber 17.

In desorber 17, the substantially dry silica gel is contacted with sufficient steam, introduced through line 18 to fluidize the gel in a manner known to the art where the gel particles under the influence of the flowing steam act as a boiling liquid having a level. The steam serves to strip off the adsorbed toluene from the silica gel. Vapors of toluene are removed from desorber 17 through line 19 and passed by lines 20 and 21 to decanter 22 where the toluene is separated from condensed steam and withdrawn through line 23, the water being withdrawn through line 24. A portion of the toluene withdrawn through line 19 may be diverted through line 25, increased in pressure by compressor 26 and passed by line 27 as part of the gas used in fluidizing the silica gel in desorber 17 and introduced through line 18.

The hot desorbed silica gel is withdrawn from desorber 17 by line 28 and passed to mixer 29. A portion of the methylcyclohexane vapors withdrawn through line 5 are passed by line 30, increased in pressure by compressor 31 and passed by line 32 to mixer 29 where they serve to fluidize the silica gel particles introduced into the mixer through line 28 and return them by line 33 to the top of the tower 1. The fluidized silica gel is cooled in cooler 34 to condense the methylcyclohexane and form a slurry with the silica gel which is collected in accumulator 35 from which it is introduced into tower 1.

The above description is limited to an operation in which the adsorbent is introduced at the top of the tower using a portion of the overhead product as a means for conveying the adsorbent from the desorber to the accumulator and for forming the slurry. Alternate methods of operation will be obvious to those skilled in the art. For example, it may be advantageous to introduce the adsorbent at a point lower in the column. In this case it will not be desirable to use the overhead product as a slurry medium since this will upset the column operations. Accordingly a portion of the internal liquid reflux may be removed from the column, used to slurry the adsorbent, and returned to the column. Alternatively, the adsorbent may be introduced into the column in an essentially dry condition by known methods.

Representative data are given in the following table showing the application of this invention to the separation of a mixture of toluene and methylcyclohexane.

A 50-50 mixture of toluene-methylcyclohexane (400 cc.) was refluxed for two hours and a sample of the vapor was analyzed. Silica gel (125 g., 28×200 mesh) was added and refluxing was continued. Samples of the vapor taken after refluxing with the silica gel for two hours and four hours, and of the supernatant liquid after four hours, were analyzed. The results are shown below:

| Sample | Percent Toluene | Percent MeCy Hexane |
|---|---|---|
| Tolune | 100 | |
| MeCy Hexane | | 95 |
| 50/50 Toluene/MeCy Hexane | 50 | 50 |
| Vapor, 2 hrs. reflux without silica gel | 38 | 62 |
| Vapor, 2 hrs. reflux with silica gel | 36 | 64 |
| Vapor, 4 hrs. reflux with silica gel | 36 | 64 |
| Liquid, 4 hrs. reflux with silica gel | 46 | 54 |

| Separation Factor | Without Silica | With Silica |
|---|---|---|
| Between 50-50 feed and vapor | 1.63 | 1.78 |
| Between 46.5-53.5 supernatant liquid and 36-64 vapor | 1.55 | |

From the above data it is evident that the relative volatility of the methylcyclohexane with respect to the toluene has been increased despite the fact that only one stage was employed and only a relatively small amount of gel was used.

The nature and objects of the present invention having been thus fully set forth and specific examples of the same given, what is claimed as new and useful and desired to be secured by Letters Patent is:

1. The method of separating hydrocarbons which form close-boiling mixtures difficult to separate by ordinary fractional distillation, which comprises continuously introducing a feed mixture of said hydrocarbons to a fractional distillation zone wherein vapors of said hydrocarbons ascend countercurrently to a slurry of a solid adsorbent in liquid reflux to effect vaporization of the hydrocarbon component rendered more volatile, continuously removing vapor of the more volatile hydrocarbon component overhead from the fractional distillation zone, and removing a slurry of the solid adsorbent in the less volatile hydrocarbon component as bottoms the weight ratio of said solid adsorbent in said distillation zone to said feed mixture being maintained above about 100%.

2. In a process of separating mixtures of hydrocarbons which form close-boiling mixtures difficult to separate by ordinary fractional distillation, the steps which comprise continuously passing vapors of said hydrocarbons up through a rectification zone wherein the hydrocarbon vapors ascend in contact with a slurry of solid adsorbent in internal reflux comprising condensate from said vapors, continuously introducing said solid adsorbent into the condensate at an upper part of the rectification zone, maintaining the solid adsorbent to hydrocarbon feed ratio above 100 weight percent and continuously withdrawing from the top of the rectification zone the hydrocarbon rendered more volatile, and continuously withdrawing from a bottom part of said rectification zone a slurry of said solid adsorbent in the hydrocarbon rendered less volatile.

3. Process for separating mixtures of hydrocarbons difficult to separate by ordinary fractional distillation, which comprises continuously introducing a feed mixture of the hydrocarbons to a rectification zone wherein vapors of the feed mixture ascend countercurrently in contact with a slurry of a solid adsorbent in liquid reflux comprising condensate from said vapors, increasing the adsorbent content of the condensate at an upper part of the rectification zone by introducing the adsorbent continuously thereto, introducing said slurry from a bottom part of the rectification zone to a stripping zone, passing said slurry in countercurrent contact with vapors boiled from the slurry as it flows down to a bottom part of the stripping zone, withdrawing from the top part of the rectification zone the hydrocarbon rendered the most volatile, withdrawing from the bottom part of the stripping zone a slurry of the adsorbent in the hydrocarbon rendered less volatile the weight ratio of said solid adsorbent in said rectification zone to said feed mixture being maintained above about 100%.

4. The method of separating hydrocarbons which form close-boiling mixtures difficult to separate by ordinary fractional distillation, which comprises continuously introducing a feed mixture of said hydrocarbon between a rectification zone and a stripping zone, contacting the vapors of the feed mixture countercurrently, with a slurry of a solid adsorbent in liquid condensate descending said rectification zone, introducing said slurry from the rectification zone to said stripping zone, passing said slurry countercurrently to vapors boiled from the slurry as it flows down to a bottom part of the stripping zone, continuously introducing said adsorbent to the top of said rectification zone, continuously removing vaporized portions of said feed mixture overhead from said rectification zone, and continuously removing a slurry of said adsorbent in the non-vaporized portion of said condensate from the bottom of said stripping zone the weight ratio of said solid adsorbent in said rectification zone to said feed mixture being maintained above about 100%.

5. In a process of separating mixtures of toluene and methylcyclohexane, the steps which comprise continuously passing a slurry of silica gel in toluene and methylcyclohexane down through a stripping zone so that the slurry flows countercurrently in contact with vapors evolved therefrom under constant refluxing and reboiling conditions, maintaining a silica gel to feed ratio at least 100 weight percent to effect vaporization of a larger part of the methylcyclohexane than of the toluene, continuously withdrawing vapors of hydrocarbons overhead from the stripping zone, the methylcyclohexane being thus withdrawn as vapor at essentially the same rate that the methylcyclohexane enters the stripping zone as a slurry with the silica gel, and withdrawing from a bottom part of the stripping zone a slurry of silica gel in toluene substantially free of methylcyclohexane.

6. In a process of separating methylcyclohexane from its mixture with toluene, the steps which comprise continuously passing vapors of a mixture of methylcyclohexane with toluene up through a rectification zone wherein the hydrocarbon vapors ascend in countercurrent contact with a slurry of silica gel in condensate from said vapors, continuously introducing said silica gel into the condensate at an upper part of the rectification zone, continuously withdrawing methylcyclohexane from the top of the rectification zone, and continuously withdrawing from the bottom part of said rectification zone a slurry of said silica gel in said toluene the weight ratio of said silica gel in said rectification zone to said mixture being maintained above about 100%.

7. In a process of separating a mixture of straight-chain and branched paraffin hydrocarbons, the steps which comprise continuously passing vapors of a mixture of straight-chain and branched paraffin hydrocarbons up through a rectification zone wherein the hydrocarbon vapors ascend in countercurrent contact with a slurry of activated coconut charcoal in condensate from said vapors, continuously introducing said activated charcoal into the condensate at an upper part of the rectification zone, continuously withdrawing branched chain hydrocarbons from the top of the rectification zone, and continuously withdrawing from the bottom part of said rectification zone a slurry of said activated charcoal in straight-chain hydrocarbons the weight ratio of said activated charcoal in the rectification zone to said mixture being maintained above about 100%.

WALTER A. HERBST.

References Cited in the file of this patent

UNITED STATES PATENTS

| Number | Name | Date |
|---|---|---|
| 2,470,339 | Claussen et al. | May 17, 1949 |
| 2,523,149 | Scheeline | Sept. 19, 1950 |
| 2,571,936 | Patterson et al. | Oct. 16, 1951 |